(12) United States Patent
Roesmann et al.

(10) Patent No.: US 9,086,048 B2
(45) Date of Patent: Jul. 21, 2015

(54) PITCH DRIVE DEVICE CAPABLE OF EMERGENCY OPERATION FOR A WIND OR WATER POWER PLANT

(75) Inventors: Tobias Roesmann, Dortmund (DE); Lars Kauke, Froendenberg (DE)

(73) Assignee: MOOG UNNA GMBH (DE)

( * ) Notice: Subject to any disclaimer, the term of this patent is extended or adjusted under 35 U.S.C. 154(b) by 94 days.

(21) Appl. No.: 13/636,786

(22) PCT Filed: Mar. 23, 2011

(86) PCT No.: PCT/EP2011/054438
§ 371 (c)(1),
(2), (4) Date: Sep. 24, 2012

(87) PCT Pub. No.: WO2011/117293
PCT Pub. Date: Sep. 29, 2011

(65) Prior Publication Data
US 2013/0020804 A1    Jan. 24, 2013

(30) Foreign Application Priority Data
Mar. 23, 2010   (DE) .................. 10 2010 016 105

(51) Int. Cl.
*H02P 1/54*  (2006.01)
*H02P 5/00*  (2006.01)
*H02P 5/46*  (2006.01)
*F03B 15/00* (2006.01)
(Continued)

(52) U.S. Cl.
CPC .............. *F03B 15/00* (2013.01); *F03D 7/0224* (2013.01); *H02P 27/08* (2013.01); *F05B 2260/76* (2013.01);
(Continued)

(58) Field of Classification Search
CPC ................................ H02K 1/27; H02K 1/276
USPC .................. 318/34, 400.3, 145, 147
See application file for complete search history.

(56) References Cited

U.S. PATENT DOCUMENTS

| 4,927,329 A * | 5/1990 | Kliman et al. ............... 416/127 |
| 2009/0155075 A1 | 6/2009 | Guey et al. |

(Continued)

FOREIGN PATENT DOCUMENTS

| CN | 101388641 A | 3/2009 |
| DE | 10335575    | 3/2005 |

(Continued)

OTHER PUBLICATIONS

International Search Report for PCT/EP2011/054438, English translation attached to original, Both completed by the European Patent Office on Nov. 17, 2011, All together 5 Pages.

(Continued)

*Primary Examiner* — Erick Glass
(74) *Attorney, Agent, or Firm* — Phillips Lytle LLP

(57) ABSTRACT

A pitch drive device capable of emergency operation by adjusting the rotor blade pitch of a wind or water power plant. The pitch drive device includes an inverter device and a three-phase current drive motor preferably a three-phase IPM synchronous motor. A direct current power storage device can be substantially directly connected to an intermediate direct current circuit, at least for emergency operation, between a rectifier device and the inverter device for at least briefly supplying power to the synchronous motor, so that the IPM synchronous motor can be operated under speed control when the intermediate circuit voltage UZK is falling. The device enables speed-controlled emergency operation of the pitch drive device at high torque when an intermediate circuit voltage UZK is falling in emergency operation, wherein the direct current energy storage device can, improve the efficiency as an energy buffer, and reduce current transfer via the rotor slip ring.

15 Claims, 5 Drawing Sheets

(51) Int. Cl.
*F03D 7/02* (2006.01)
*H02P 27/08* (2006.01)

(52) U.S. Cl.
CPC ....... *F05B 2260/79* (2013.01); *F05B 2270/107* (2013.01); *F05B 2270/1074* (2013.01); *Y02E 10/226* (2013.01); *Y02E 10/721* (2013.01); *Y02E 10/723* (2013.01)

(56) References Cited

U.S. PATENT DOCUMENTS

2010/0259045 A1* 10/2010 Vilbrrandt ...................... 290/44
2011/0046802 A1* 2/2011 Jones et al. ................... 700/287

FOREIGN PATENT DOCUMENTS

| DE | 102007054228 | | 5/2009 |
|---|---|---|---|
| EP | 1128064 | | 8/2001 |
| EP | 1624553 | | 8/2006 |
| EP | 1852605 | | 11/2007 |
| WO | WO 2009/050157 | * | 4/2009 |

OTHER PUBLICATIONS

Chinese Office Action dated Aug. 29, 2014 for the corresponding Chinese Application No. 2011800148963 filed Mar. 23, 2011, 12 pages.

* cited by examiner

PITCH DRIVE DEVICE CAPABLE OF EMERGENCY OPERATION FOR A WIND OR WATER POWER PLANT

PRIOR ART

The present invention relates to a pitch drive device capable of emergency operation for adjusting a rotor blade pitch of a wind or water power plant.

Devices of the generic type serve to change a pitch angle (pitch) with respect to a flowing medium of air or water of a rotor blade in order to drive an energy generating device, in particular a power generator.

The prior art has disclosed the use of DC and AC asynchronous motors (ASM) in electromechanical drive systems to adjust the rotor blade of a rotor of a wind or water power plant which can be controlled as a function of the rotational speed. DC machines are used since they permit emergency movement of the rotor blade into a safe vane position even in the event of a failure of control electronics and power electronics, wherein an accumulator pack or battery pack supplies the direct voltage in the event of a power system failure. AC machines are frequently used since they are virtually maintenance-free and are cost-effective and can make available high torque power levels. As a rule, asynchronous motors whose rotational speed can be controlled by power electronics in most cases are used as AC machines, wherein said power electronics comprises as a rule a rectifier device and an inverter device as well as a control device for PWM actuation of the motor windings. For an emergency operating mode, in many cases alternative DC drives are provided which can carry out an emergency movement by means of a direct voltage source in the event of a power supply failure.

The rotational speed is as a rule controlled on the basis of measured data from rotational speed sensors or position sensors. In the case of a sensor failure, ASMs, controlled in the V/f operating mode (voltage/frequency control), can be moved into a safe position, in particular a safe vane position. In both DC and AC motor types it is possible to weaken fields in order to permit high rotational speeds even in the case of low direct voltage intermediate circuit voltages. A field weakening mode means that as the rotational speed increases the strength of the driving magnetic field is weakened, while the current remains constant. In this context, the torque which can be output also decreases, since the torque is a product of the magnetic field and the current.

DE 103 35 575 A1 describes a pitch drive device for an emergency operating mode, in which pitch drive device an energy store is fed by means of a rectifier of a power inverter. The feeding is carried out in a switchable fashion by means of a charging resistor. In an emergency operating situation, the intermediate circuit can be energized via an isolating diode, wherein the energy store has a very high capacitance, so that the level of the intermediate circuit rated voltage in the normal operating mode can be maintained in the emergency operating mode over a relatively long time, in particular several seconds. A usual three-phase current motor is used as the pitch motor.

US 2009/0155075 A1 discloses a pitch drive device in which, in the case of a malfunction of a power-system-bound inverter controller of the pitch motor it is possible to switch between the power-system-bound inverter controller and an interruption-free emergency operating mode inverter controller. In this context, a field-oriented vector control unit is provided for sensorless control of the rotational speed.

A number of disadvantages occur in the prior art: DC motors are very costly and highly maintenance-intensive. Owing to their low power density, their moment of mass inertia is generally high. As a result, these motors are not suitable for dynamic applications such as continuous individual blade control in the reversing mode. AC machines have the disadvantage that the theoretical peak torque drops quadratically with the voltage. Owing to the low intermediate circuit voltage $V_{ZK}$ of less than 400 volts in the case of a fault, AC machines have to be configured for a low voltage and forcibly bring about a high current flow which the inverter has to make available.

These disadvantages are solved by a device as claimed in independent claim 1. Advantageous developments are the subject matter of the dependent claims.

DISCLOSURE OF THE INVENTION

According to the invention, a pitch drive device capable of emergency operation for adjusting a rotor blade of a wind or water power plant is proposed, which pitch drive device comprises at least one inverter device and one three-phase current drive motor. The three-phase current drive motor is embodied as a permanent-magnet-excited three-phase current IPM (Interior Permanent Magnet) synchronous motor. An IPM synchronous motor with a rotor which is equipped with permanent magnets which are buried in the interior of the rotor can, in the case of a dropping intermediate circuit voltage, for example in the event of a failure of one or two power system phases of a three-phase current power system supply, a defect in a branch of a rectifier or inverter or in the case of emergency operation by means of an intermediate circuit emergency operation direct voltage source, reach a higher torque than a comparable conventional synchronous motor with a moving coil rotor which is supplied with direct current or SPM (Surface Attached Permanent Magnet) rotor. As a result, a high torque can be achieved in the case of a dropping supply voltage, in particular in the event of a fault, and fast emergency movement or adjustment of the rotor can be achieved in the event of a fault. As a result, the robustness of the rotor blade adjustment device is significantly enhanced and the safety of the energy plant improved.

According to the invention, for an emergency operating mode, a direct voltage energy storage device is connected substantially directly to a direct voltage intermediate circuit between a rectifier device and the inverter device in order to at least briefly supply energy to the synchronous motor, with the result that the IPM synchronous motor can be operated at least briefly under rotational speed control even when the intermediate circuit voltage $V_{ZK}$ is dropping. As a result, at least in the emergency operating mode the energy storage device can feed DC energy directly into the intermediate circuit between the rectifier device and the inverter device, and the synchronous motor can be operated under rotational speed control, as long as the energy storage device can make available energy.

The invention is based on a system concept which combines various advantages. One advantageous pitch drive device comprises three core components: a synchronous machine with a permanent magnet rotor which has buried magnets and which serves as a pitch drive motor, an inverter unit as a servo power inverter and finally a direct voltage energy storage device as a backup energy store, advantageously composed of high-capacitance capacitors. The direct voltage energy storage device is coupled directly to the intermediate circuit between the rectifier unit and the inverter unit without, for example, isolating diodes which are known from the prior art having to be used. This means that the voltage level of the intermediate circuit $V_{ZK}$, of the power inverter device and of the energy storage device is nominally identical.

For an emergency operating mode, a direct voltage energy storage device can advantageously be connected substantially directly to a direct voltage intermediate circuit between a rectifier device and the inverter device in order to at least briefly supply energy to the synchronous motor, with the result that the IPM synchronous motor can be operated at least briefly under rotational speed control even when the intermediate circuit voltage $V_{ZK}$ is dropping. As a result, at least in the emergency operating mode the energy storage device can feed DC energy directly into the intermediate circuit between the rectifier device and the inverter device, and the synchronous motor can be operated under rotational speed control, as long as the energy storage device can make available energy.

The invention is based on a system concept which combines various advantages. One advantageous pitch drive device comprises three core components: a synchronous machine with a permanent magnet rotor which has buried magnets and which serves as a pitch drive motor, an inverter unit as a servo power inverter and finally a direct voltage energy storage device as a backup energy store, advantageously composed of high-capacitance capacitors. The direct voltage energy storage device is coupled directly to the intermediate circuit between the rectifier unit and the inverter unit without, for example, isolating diodes which are known from the prior art having to be used. This means that the voltage level of the intermediate circuit $V_{ZK}$, of the power inverter device and of the energy storage device is nominally identical.

In the event of a failure of a power system supply, the direct voltage energy storage device usually cannot maintain the high level of the intermediate circuit voltage of 560 V DC, with the result that the direct voltage $V_{ZK}$ can drop to 100 V as a function of the energy consumption by the pitch drive and of the storage capacity. In this situation, conventional SPM (Surface Permanent Magnet) synchronous motors can only be subjected to rotational speed control inadequately and within narrow limits, their torque experiences a severe reduction and there is a high risk of the pitch drive failing.

Synchronous motors generally have the advantage that the stationary state torque depends exclusively on the available motor current and does not have any dependence on the available voltage, as, for example, in the case of compound winding or in asynchronous machines. According to the invention, the synchronous motor is an IPM (Interior Permanent Magnet) synchronous motor with rotor magnets which are buried on the inside. An IPM synchronous motor has a high reluctance, with the result that it has similar properties to a reluctance motor. In this context, the reluctance characteristic due to the buried magnets provides two advantages: the peak power of the machine in the case of a low intermediate circuit voltage is higher than that of a machine which is equipped with surface magnets. Furthermore, the reluctance effect of the machine can be utilized to control the machine at low rotational speeds with large torque reserves without using sensors. In the event of failure of the rotary signal generator, the blade can therefore still be reliably moved into the safe vane position.

This advantage is made possible by the following property of the IPM motor: IPM synchronous motors have a significant difference between the longitudinal inductance Ld and the transverse inductance Lq, wherein as a rule Lq>Ld. Ld and the current Id which flows through it describe the field-forming component of the magnetic field, and Lq and Iq describe the torque-forming component. As a result of this difference, an IPM motor, as illustrated in FIG. 6, is extremely well suited for making available relatively high torques, and for being controlled without sensors, in the case of relatively low rotational speeds and in the case of a reduced voltage.

In the case of an IPM design, the permanent magnets are fitted into cutouts in a rotor, as illustrated in FIG. 5. As a result, a small mechanical air gap can be achieved, which leads to a relatively large influence on the inductance value of the stator winding. Owing to the permanent magnet arrangement, the effective air gap in the direction of the rotor flux axis (d direction) is larger than that in the q direction, as a result of which the inductance drops in the d direction compared to the inductance in the q transverse axis. This asymmetry of the machine (Ld<Lq) brings about an additional reluctance torque and permits the abovementioned advantage.

The device according to the invention, the advantageous developments described below and the previous system features have the following objective:

Increasing the system efficiency:
  The energy which is produced during reversing is not converted into heat, as was previously the case by a brake chopper (braking resistor) but instead can be stored in the energy storage unit, preferably in a capacitor arrangement.
  As a result of the special characteristic of a synchronous motor, in particular of an IPM (Integrated Permanent Magnet) synchronous motor, the power drain of the motor can be minimized given a corresponding load.
  As a result of limitation of the intermediate circuit input current, necessary load peaks can be taken up by the stored energy in the energy storage unit. The maximum loading on the slip ring and on the power system drops. Power losses are reduced and the rotor slip ring is protected.
  As a result of a low moment of mass inertia of the synchronous motor due to the design, the losses during acceleration and braking of the drive can be reduced.

Increasing the system safety:
  As a result of the possibility of controlling the synchronous motor without a sensor it is possible, at least in the emergency operating mode, for the pitch drive device to carry out autonomously a controlled movement into the safe vane position even at very low rotational speeds, if a rotary signal generator fails.
  Necessary, output-side power/torque peaks can also be made available when the power-system-side voltage supply fails.
  If the energy storage unit fails, the braking functionality can nevertheless be ensured by means of an advantageous emergency braking resistor unit. A controlled emergency movement into the safe vane position can still be carried out.

In summary, the invention permits at least one emergency operating mode of the pitch drive device under rotational speed control in the event of a dropping intermediate circuit voltage $V_{ZK}$ with high torque, wherein the direct voltage energy storage device as an energy buffer improves the efficiency, and reduces the transmission of current via the rotor slip ring.

According to an advantageous development, the IPM synchronous motor can be configured for a large rotational speed range of 300 to 3000 rpm, wherein an optimum efficiency in the lower rotational speed range, in particular in the range of a rated rotational speed of 500 rpm, should be achievable. In particular, in the case of an emergency movement, a high rotational speed of 2500 rpm or more can be used to move the rotor blade into a safe vane position in a short time. If the reluctance torque of an IPM synchronous motor is utilized by means of correspondingly modified control of the inverter device, the IPM motor has a larger torque rotational speed range in the case of a direct intermediate circuit voltage than a comparable synchronous motor with magnets which are arranged on the surface (SPM Surface Permanent Magnet). This property of a large rotational speed torque range is advantageous, in particular, for use as a rotor blade drive, since large power reserves have to be made available for a short time during the emergency travel, i.e. peak moments have to be made available at high rotational speeds. The possibility of a field-weakening mode, which is made available by an IPM synchronous motor, permits a large torque/rotational speed range to be utilized even if the intermediate circuit voltage of the energy storage device, in particular of a capacitor arrangement, has dropped to a low value (to 100-200 V DC). As a result of the possibility of utilizing a large voltage range, the storage capacity of the energy storage device can be made smaller than when a conventional pitch drive motor is used. On the other hand, it becomes possible to configure the IPM synchronous motor with a very large torque. A large torque constant means that the IPM synchronous motor permits a large torque yield for a given current flow. Hitherto, the magnitude of this constant was limited since an increase in the torque constant directly influences the maximum rotational speed. If, for example, in the case of a standard SPM (Surface Permanent Magnet) synchronous motor, the torque constant is increased by 40%, the maximum possible rotational speed drops by approximately 40% owing to the relatively large induced voltage. However, given the proposed use of an IPM motor, up to 30% of the torque originates from what is referred to as the reluctance moment which does not have any influence on the induced voltage. If it were desired to increase the torque constant as in the example above by, for example, 40%, the maximum rotational speed is only reduced by 28%. As a result, it becomes clear that due to the use of the IPM motor the power drain can be minimized for a corresponding torque, and that it is ensured that desired power target values ($M_{max}$ @ $N_{max}$) are achieved.

According to one advantageous development, the direct voltage energy storage device can be a high-capacitance capacitor arrangement. The capacitor arrangement can be connected substantially directly to the intermediate circuit, with the result that the entire intermediate circuit voltage is present at the capacitors. During an adjustment of a rotor blade, continuous reversing processes, i.e. frequent processes of reversal of the direction of rotation, typically occur at the synchronous motors, as a result of which voltage peaks and fed-back regenerative energy or braking energy are generated. A high-capacitance capacitor arrangement is capable of taking up the regenerative energy or voltage peaks, with the result that they do not have to be eliminated, as hitherto, by a braking resistor and converted into heat. This increases the efficiency of the system and serves to minimize the energy. Furthermore, the capacitors are available for brief power peaks of the rotor blade drive, and therefore minimize the power flow from the power system and consequently relieve the loading on the system slip ring which transmits energy from the fixed gondola into the moved rotor axle.

In this context, according to one advantageous development the direct voltage energy storage device can be configured for an intermediate circuit voltage $V_{ZK}$ of 100 V DC to 600 V DC. The electric energy storage device in the pitch drive device has the following functions:

1. Making available the energy in order to carry out an inverter-controlled emergency movement in the event of a failure of the power-system-side supply (time range up to 20s);
2. supplying brief power peaks (time range over 4s, at least 3s);
3. storing the entire energy which occurs when the pitch drive is braked. (Reversing process).

Hitherto, known energy storage devices, preferably capacitor arrangements, were configured only for just the function specified under 1. This involved exclusively passive energy stores, i.e. batteries or accumulators, which were active only during the emergency travel, in order to perform the function specified under 1. The voltage level of these known energy storage devices is usually below the nominal intermediate circuit level of approximately 560 V DC and said devices are therefore protected against undesired charging by the intermediate circuit by means of an isolating diode, and are often only connected to the intermediate circuit in the emergency operating mode. Furthermore, for the known energy storage device a separate charge unit is usually necessary for charging, and maintaining the charge of, the backup accumulator arrangement.

In addition, there are energy storage devices in which direct coupling of the capacitor arrangement to the intermediate circuit is performed in order to carry out the functions specified under 2. and 3., but these do not meet the function specified under 1. In this context, the capacitor arrangements are configured explicitly for a reduced intermediate circuit voltage of approximately 100 V.

The following are particular features of the advantageous energy storage device, in particular of the proposed capacitor arrangement, compared to the previous prior art:
The nominal voltage of the energy storage device is the customary intermediate circuit voltage $V_{ZK}$, in particular approximately 560 V;
the energy storage device is connected virtually directly to the intermediate circuit;
regenerative energy is mainly taken up by the energy storage device. The intermediate circuit voltage is correspondingly increased, and a braking resistor can be dispensed with;
in the event of a failure of the power-system-side voltage supply, the energy storage device voltage, and therefore also the intermediate circuit voltage, can drop from initially 560 V DC to 150 V DC;
permitting this voltage drop during the emergency movement means that the capacitance of the capacitor arrangement can be minimized, since in the case of relatively high voltages more energy can be stored with smaller capacitances. Compared with the previous "low voltage" configuration, the capacitance of the capacitor arrangement can be up to 50 times smaller, as a result of which a very large cost saving can be achieved. A reduced capacitance requirement enables the use of alternative, cost-effective capacitor technologies for the capacitor arrangement and leads to a reduction in the costs for the pitch drive device.

According to an advantageous development, the direct voltage energy storage device can be connected to the intermediate circuit via a coupling unit, in particular a diode-based coupling unit, in order to suppress interference voltage peaks, wherein in order to increase the capacitance of an intermediate circuit capacitor the coupling unit can preferably comprise at least one further intermediate circuit capacitor. A coupling unit ensures that switching losses can be covered by the internal intermediate circuit capacitors, and not by the energy storage device, since this provides advantages with respect to the EMC (requirements made of the electro-magnetic compatibility) as well as the efficiency. In this context, the coupling unit can permit decoupling of the energy storage device and intermediate circuit at a voltage level of $V_f$, wherein a coupling, i.e. a flow of current, occurs only when there is a difference between $V_{ZK}$ and the voltage of the energy storage device if a voltage difference is greater than $V_f$ occurs. As a result of a diode-based coupling unit, the energy storage device is not loaded by current ripples as long as the intermediate circuit voltage does not drop below a component-specific value $V_f$ of the coupling unit. Furthermore, the coupling unit can preferably be expanded by further intermediate circuit capacitors which are connected between the DC lines of the intermediate circuit, as a result of which the internal intermediate circuit capacitance can be extended by correspondingly suitable capacitors, in order to reduce further the voltage fluctuation of the intermediate circuit. Alternatively or additionally, the coupling unit can comprise an inductance circuit in order to suppress high-frequency interference and to smooth the current, with the result that the energy storage device can be gently loaded and unloaded. It is also possible to intermediately connect a Zener diode circuit or a comparable circuit, for example one or more Zener diodes in a series circuit, whose zener voltage $V_z$ can correspond, for example, to the voltage $V_f$. A combination of the above component elements in a passive coupling unit can preferably be included.

According to one advantageous development, the coupling unit can comprise a control means and a switching means, as a result of which at least one charge current IG can be switched from the direct voltage intermediate circuit to the direct voltage storage device. The coupling unit of this development comprises active components which can be connected to the abovementioned passive components in any possible combination and which can switch at least the charge current IG. The switching means can be an electromechanical switching means such as a contactor or relay, or an electronic semiconductor switching means such as an IGBT (Insulated Gate Bipolar Transistor), power FET or the like. The control means can be an electronic control circuit, FPGA, microcontroller or the like. The control means can receive switching commands from an external monitoring and control device and activate, i.e. switch on, the switching means, for example in an emergency, when the intermediate circuit voltage is dropping, when the drive motor is starting, in the event of a power system failure, a defect at the rectifier device or the like, and deactivate the switching means, for example in the normal operating mode or during special load ranges of the IPM motor in which high current pulses occur in the intermediate circuit. Controlled charging of the energy storage device and/or controlled taking-up of regenerative energy of the intermediate circuit are possible by selective activation of the switching means. The control means can basically activate the switching means in two different ways: on the one hand by means of a control method, for example a closed control loop for controlling the charging current IG by means of PWM-like control concepts or the like. On the other hand, by means of static activation/deactivation of the switching means on the basis of external control signals, for example by a superordinate pitch motor control device. Charge control of the energy storage device can be made possible by means of the first-mentioned control method (adjustment to a constant current or constant voltage of the intermediate circuit). Within the scope of the second-mentioned possibility it is possible to activate the switching means, i.e. close it, as soon as regenerative energy flows back from the energy store into the intermediate circuit.

The switching means can be controlled similarly to a conventional control of a chopper IGBT in an inverter. As a result, regenerative energy can be stored in the energy store and the energy can be supplied back to the motor after the ending of the regenerative phase (for example of the generator drive of the IPM motor). The switching means can be activated while the inverter is starting. The switching means can therefore permit and assist current-limited starting of the motor by pre-charging of the intermediate circuit. During the pre-charging process, the switching means can be closed, and in the normal operating mode the energy store can be re-charged. As a result, switchable coupling and decoupling of the energy storage device and the intermediate circuit can be brought about, and the energy storage device therefore continues to be protected against current peaks which occur during the motor operation. This permits an increased service life of the energy storage device and an improved emergency running capability.

According to one advantageous development, a bypass branch, which comprises a coupling diode for supplying the direct voltage intermediate circuit with a supply current $I_M$, can be connected in parallel with the switching means, with the result that a supply current $I_M$ can flow independently of the switched state of the switching means. As a result, insofar as the voltage of the intermediate circuit $V_{ZK}$ is smaller than that of the energy storage device $V_B$, the intermediate circuit can be supplied with energy from the energy storage device in a purely passive fashion without activation of the switching means, with the result that the operational reliability and emergency running capability of the entire device is increased without an active intervention. The control means can actively control charging of the energy storage device by controlling the current IG, and the emergency supplying of the intermediate circuit occurs independently of the switch position of the switching means.

According to an advantageous development, at least the switching means can be a semiconductor switching means and be integrated in a housing of a semiconductor power module together with semiconductor switching means of the inverter device and/or semiconductor bridge diodes of the rectifier device, preferably in an IPM (Integrated Power Module) housing. Conventional IPMs, in particular DIP-IPMs (Dual-Inline Package IPMs) comprise not only power semiconductor components for an inverter device and/or rectifier device but also individual semiconductor switching means, for example for a brake chopper, wherein these semiconductor switching means can be used at least partially as semiconductor switching means for an active coupling unit. A compact and favorable design can therefore be achieved.

According to one advantageous development, the inverter device can comprise a field-oriented vector control unit for controlling the rotational speed of the synchronous motor without a sensor, which vector control unit can perform rotational speed control at least in one operating mode and preferably in a lower rotational speed range of the synchronous motor of 300 to 700 rpm, in particular at a rated rotational speed of 500 rpm. However, it is to be ensured that in the emergency operating mode rapid adjustment with a high rotational speed of over 1500 rpm, in particular in the range of 2500 rpm, can be achieved without a sensor. A vector control unit can perform rotational speed control of the IPM motor, in particular in the event of a failure of a sensor-based controller, for example in the event of a failure of a rotational speed sensor or rotational angle sensor. Basically, the rotational speed sensorless control can control the synchronous motor in all operating modes, i.e. in the undisturbed normal operating mode, in the case of the occurrence of faults (fault operating mode) or in an emergency operating mode. The sensorless control will preferably be used at least in a fault mode in which, for example, one or more rotational speed sensors or rotational angle sensors of a sensor-supported controller fail, at least one power system phase fails or when switching over between a power system operating mode and a self-powered operating mode etc. Furthermore, the sensorless control can advantageously bring about rapid adjustment of the rotor blade into a safe vane position in an emergency operating mode with a high wind load, in the case of failure of the voltage supply, etc.

Generally, a vector control is understood to be a movement of the space vector which rotates with the motor shaft. It is generally based on feedback of a control loop from the motor and successive transformation of the measured stator currents. In the case of vector control, by means of what is referred to as a d/q transformation, the torque is adjusted only by means of the q component of the stator current, and the d component approaches zero in the permanent-magnet-excited three-phase current synchronous machine. If stator flow and stator current in the rotating D-Q field (by means of d/q transformation from the 3-phase system) in the synchronous motor are parallel, the torque is equal to zero. On the other hand, in the case of a space vector which is at a right angle, a maximum torque is produced. In this case, the exciter flow and the flow through the armature are perpendicular to one another, similarly to the direct current machine. This is therefore the aimed-at state of the control. Conventionally, in order to compensate for the space vector at a right angle a control loop which has feedback and which indicates the position of the pole wheel is required. This feedback was usually performed by means of rotational speed sensors or encoders (resolvers, optical incremental and absolute value sensors or inductive sensors). The proposed sensorless controller can be implemented in block commutation (PWM motor actuation) by measuring back the opposing voltage induced in the motor. This feedback has increasing disadvantages in conventional SPM motors, in particular at low speeds, but can be used very advantageously, in particular in IPM motors, as is explained below:

The inverter device can have an adapted control software of a microcontroller which controls the reversing processes (reversal of the direction of rotation), which software makes it possible, on the one hand, to control the synchronous motor, preferably an IPM synchronous motor, without sensors and to utilize the reluctance torque during the normal operating mode in order to increase the efficiency of the motor. In addition, the vector control unit can be capable of compensating the voltage which drops during the emergency movement from over 500 V, in particular 560 V to below 300 V, in particular 200 V, by means of corresponding field weakening in order to continue to make the necessary peak power available on the output side. Of course, a synchronous motor, in particular an IPM synchronous motor, has inductances Ld and Lq of different sizes and has what is referred to as a reluctance torque. The different inductances can be used to operate the motor without a sensor even at low rotational speeds. In traditional machine types this is possible only for high rotational speeds. In this context, a sinusoidal injection current is superimposed on the setpoint current, the measurement of which injection current makes it possible for a technical control observer, calculated in the drive, to estimate the current rotational speed. The IPM synchronous motor described here is particularly well suited for the described type of sensorless control. The motor controller which is used and which is implemented in software of the inverter device can advantageously have the following properties:

In general there are two ways of influencing the torque of an electric motor:
  magnetic flux 25
  torque-forming motor current Iq.

When AC motors are controlled there is a direct relationship between the magnetic flux and what is 30 referred to as the d current Id, as well as the torque-forming current Iq. The total current drain of the machine is obtained as follows:

$$I_{abs} = \sqrt{I_d^2 + I_q^2}$$

Minimizing this current value as a function of the current working point of the motor (Mact, nact) (torque, rotational speed) is the function of a loss-optimized controller. When a preferred IPM synchronous motor is controlled, this type of control is particularly advantageous by virtue of its structure-conditioned properties. This requires the excellent possibility of field-weakening operation of an IPM synchronous motor particularly in the application described here. The rotational speed which is requested during the emergency movement is two to three times higher than the average rotational speed during operation. For this reason, the motor should be configured, in particular for low rotational speeds, but must briefly be capable of being operated (for at least more than 10s, preferably at least 20s) even at double to quadruple speed, preferably triple speed, in order to be able to carry out a rapid emergency movement. An IPM motor is extremely well suited for these requirements for structural reasons since said motor has a robust attachment of the buried magnets, and therefore permits high overspeeds, and the magnetic circuit is robust with respect to demagnetization phenomena, both in the field-weakening mode and in the overload range. As a result of a large difference between q and d inductance it is possible to carry out sensorless control of the motor even at low rotational speeds. For this purpose, what is referred to as an injection signal is impressed on the motor current in the low rotational speed range, by means of which injection signal a technical control observer can detect the current rotor position on the basis of the structurally conditioned magnetic asymmetry. As a result of the possibility of sensorless control, the pitch drive can be adjusted at least in an emergency movement, and move into what is referred to as the safe vane position under the influence of the full load, even in the event of failure of a rotational speed sensor.

According to one advantageous development and subsequent to the preceding exemplary embodiment, the inverter device can comprise a conventional sensor control unit which is connected to one or more mechanical rotational speed sensors (encoders) for controlling the rotational speed of the synchronous motor, and comprise a control switch-over unit which can switch over between the sensor control unit for rotational speed control in the normal operating mode and the vector control unit for rotational speed control in the emergency operating mode. The sensor control unit controls the PWM switching processes of the inverter device according to measured rotational speeds of the rotational speed sensor and can, as an additional pitch control unit, preferably perform actuation of the synchronous motor in a normal operating mode. The control switch-over unit can carry out the switching over of the motor control between a conventional sensor control unit which is active in the normal operating mode and a vector control unit, autonomously or on request. This means that if the failure of a sensor occurs during the normal operating mode, this failure is reported to the superordinate controller or controller switch-over unit and an automatic switch-over into a sensorless operating mode occurs.

According to one advantageous development, the rectifier device can comprise a current control unit for limiting the picked-up power system current and/or for the current-controlled charging of the direct voltage energy storage device of the intermediate circuit capacitor and of the inverter device, wherein in the normal operating mode the current control unit can adjust the intermediate circuit voltage $V_{ZK}$ to a presettable value. A fully controlled input bridge of the rectifier device can ensure that the input current can be limited to a maximum permissible value, in particular in the case of a discharged direct voltage energy storage device, wherein during the charging of the energy storage device the flow of current can be limited in order to prevent an overload situation. The current control unit can perform the following functions and tasks:

Current-controlled charging of the entire intermediate circuit (inverter, DC intermediate circuit and energy storage device) to a nominal 10 intermediate circuit voltage $V_{ZK}$ of, in particular, 560 V;
  limiting of the maximum power drain from the power system to an adjustable value: $I_{max}=K_2 I_{Nom}$ where 15 $K_2=1\ldots 2$;
  the intermediate circuit voltage $V_{ZK}$ can be set to an adjustable value by means of the precharging circuit;
  if an overload of the current control unit occurs, an advantageous emergency braking resistance unit can be briefly activated.

According to one advantageous development, an emergency braking resistor unit can be connected to the direct voltage intermediate circuit in such a way that it can be activated in order to divert electrical energy for rapid braking of the synchronous motor, wherein the braking resistor unit can be activated, in particular, in the case of an increased intermediate circuit voltage $V_{ZK}$. As a result, in the case of a faulty energy storage device or a fault in a current control unit, a power-system-supported emergency movement, including a braking process, can still be carried out.

DRAWINGS

Further advantages can be found in the present description of the drawings. The drawing illustrates exemplary embodiments of the invention. The drawing, the description and the claims contain numerous 5 features in combination. A person skilled in the art will also expediently consider the features individually and combine them to form appropriate further combinations.

EMBODIMENTS OF THE INVENTION

Identical components or components of the same type are denoted by identical reference signs in the figures. The following diagrams serve to provide schematic illustration, and therefore, for example, a connecting line signifies an electrical connection between two electrical devices and as a rule comprises at least one forward line and one return line. Switching symbols represent not only individual components but also a circuit assembly which can comprise one or more components.

Figure 1:
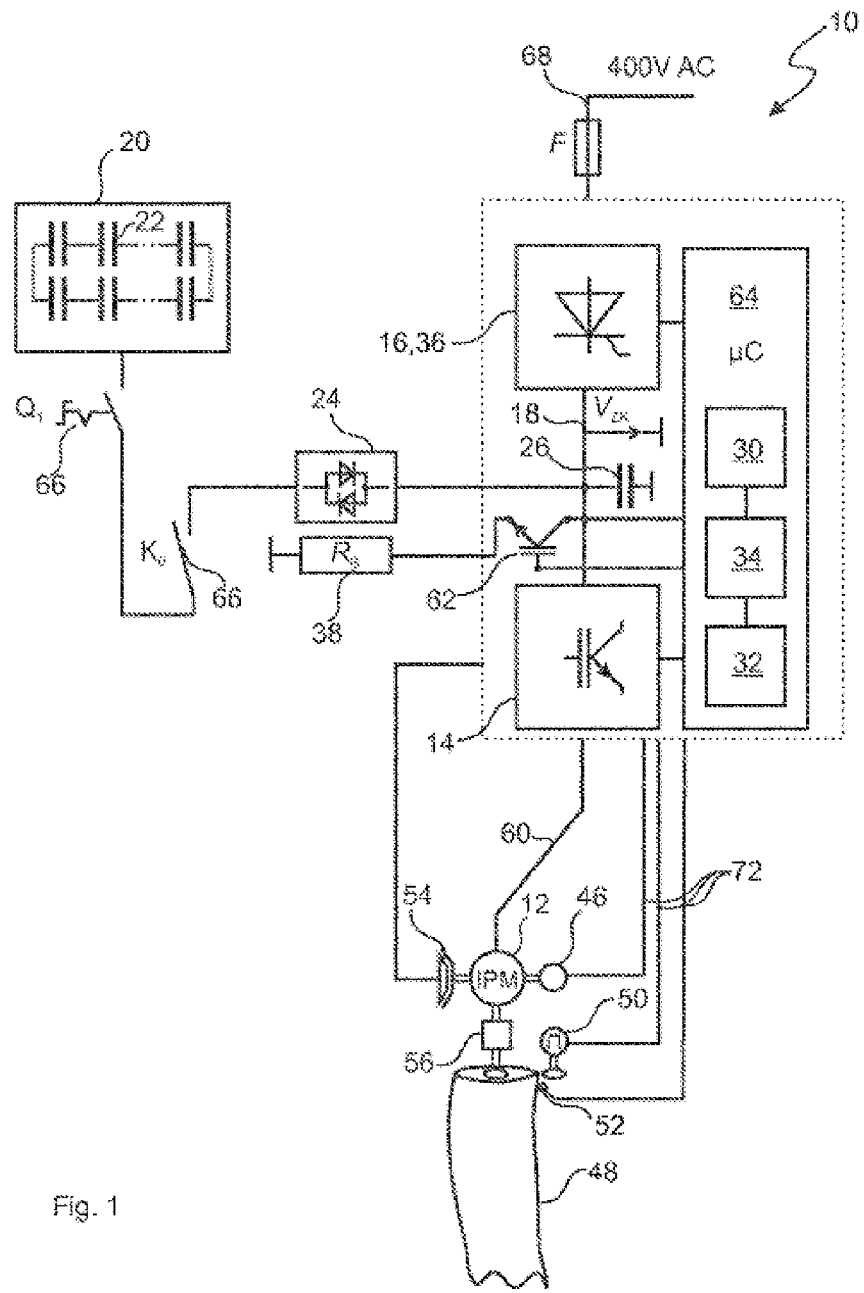
FIG. 1 shows a first exemplary embodiment of a pitch drive device according to the invention.

FIG. 1 is a schematic representation of a first exemplary embodiment of a pitch drive device 10 according to the invention. The pitch drive device 10 comprises a synchronous motor 12, which is embodied as an IPM motor, as well as a direct voltage energy storage device 20 and an inverter device 14, which actuates the motor 12 via a PWM (Pulse Width Modulation) motor actuation line 60 by means of a motor control device 64, in order to set a desired rotor blade adjustment of a rotor blade 48.

The pitch motor 12 is coupled via a pitch gear mechanism 56 for converting the rotational speed to the supported root point of the rotor blade 48 wherein a controlled operating mode of the pitch motor 12 can change the pitch angle (pitch) of the rotor blade 48 of 20 a wind power plant or water power plant. In order to determine the rotational position of the motor 12, a rotational speed sensor 46, a rotational angle sensor 50 and an end position sensor 52, which can indicate an end stop position of the rotor blade 48, are connected, via one or more sensor lines 72, preferably via a sensor bus, to the motor control device 64, as a result of which a sensor control unit 32, which is included in the motor control device 64, can receive the rotational speed and rotational angle of the motor 12. The motor control device 64 can perform correct phased actuation of an inverter, included in the inverter device 14, by means of the sensor device, in order to set a desired direction of rotation and rotational speed of the motor 12. The motor 12 can furthermore be braked by means of a brake 54, and the brake 54 is in turn activated by the motor control device 64.

In the normal operating mode, electrical energy is drawn via a supply power system 64, wherein an upstream fuse element F protects the pitch drive device 10 against overvoltage. The supply voltage is transmitted via a system slip ring of a fixed gondola of a wind power plant to the rotating rotor axis. Within the pitch drive device 10, the power-system-side 400 V three-phase oscillating current is rectified into a direct voltage of the intermediate circuit 18, which is generally $V_{ZK}=560$ V (400 V*1.41), by means of a rectifier device 16. The rectifier device 16 also comprises a current control unit 36 which monitors and limits the flow of current so that when the pitch drive device 10 starts up a reduced current flows, in particular for charging the energy storage device 20 and for bringing about a desired intermediate circuit voltage $V_{ZK}$. An intermediate circuit capacitor 26 for smoothing the rectified voltage $V_{ZK}$ of the rectifier device 16 and for conducting away voltage peaks which are caused by the high-frequency switching processes of the inverted device 14, is connected to the intermediate circuit 18, between the potential conductors of the intermediate circuit 18. Furthermore, a braking resistance unit 38 is connected to the intermediate circuit 18 in such a way that it can be shifted by means of a brake switch element 62 which can be a semiconductor switch element. The motor control device 64 can conduct current from the intermediate circuit 18 into the braking resistor unit 38 by activating the brake switch element 62, as a result of which the intermediate circuit 18 can become energy-free, and the pitch motor 12 can therefore be braked electrically.

At least in the emergency operating mode, a direct voltage energy storage device 20 can be connected directly to the intermediate circuit 18 via a contactor contact $K_0$ and a coupling unit 24. The contactor contact $K_0$ and the switch $Q_1$ which has to be activated manually serve as energy storage switching devices 66 which permit electrical disconnection of the energy storage device 20 from the intermediate circuit 18, for example in the case of a repair or maintenance. The energy storage device 20 comprises a series and parallel connection of capacitors to a high-capacitance capacitor arrangement 22, which energy storage device 20 is capable of storing energy on the potential level $V_{ZK}$ of the intermediate circuit 18, wherein in the emergency operating mode the stored electrical energy can be fed briefly into the intermediate circuit 18, in order to permit at least an emergency movement of the motor 12. The energy storage device 20 is coupled via a coupling unit 24 to the intermediate circuit 18, wherein the coupling unit 24 has the function of suppressing a flow of current in the case of slight voltage fluctuations between the intermediate circuit voltage $V_{ZK}$ and the voltage of the energy storage device 20, in order to reduce the loading of the energy storage device 20, wherein voltage fluctuations can be taken up by the intermediate circuit capacitor 26. The coupling unit 24 therefore serves to distribute functions between the energy storage device 20 and the intermediate circuit capacitor 24 in a defined manner. The motor control device 64 also comprises a control switching unit 34 which, in the event of a transition from a normal operating mode into an emergency operating mode, can switch over between the sensor control unit 32 and a field-oriented vector control unit 30. The field-oriented vector control unit 30 performs sensorless control of the IPM motor 12 on the basis of measured motor currents, wherein the characteristic configuration of the IPM motor permits precise control of the driving behavior of the pitch drive, in particular in low rotational speed ranges.

In an emergency operating mode, for example when the supply power system 68, the rectifier device 16, a rotational speed sensor 46, rotation angle sensor 50, end position sensor 52, etc. fail, the control switching unit 34 of the motor control device 64 switches from a sensor control device 32 to a vector control unit 30 which controls the rotational speed of the IPM motor 12 on the basis of measured injection currents. In this case, energy from the energy storage device 20 is conducted into the intermediate circuit 18, wherein the voltage $V_{ZK}$ of the intermediate circuit 18 can drop to below 200 V. Owing to the IPM characteristic of the motor 12, field-oriented PWM actuation can be carried out even in the case of a reduced intermediate circuit voltage $V_{ZK}$ and at low rotational speeds, with the result that at least a safe vane position of the rotor blade 48 can be assumed.

Figure 2:
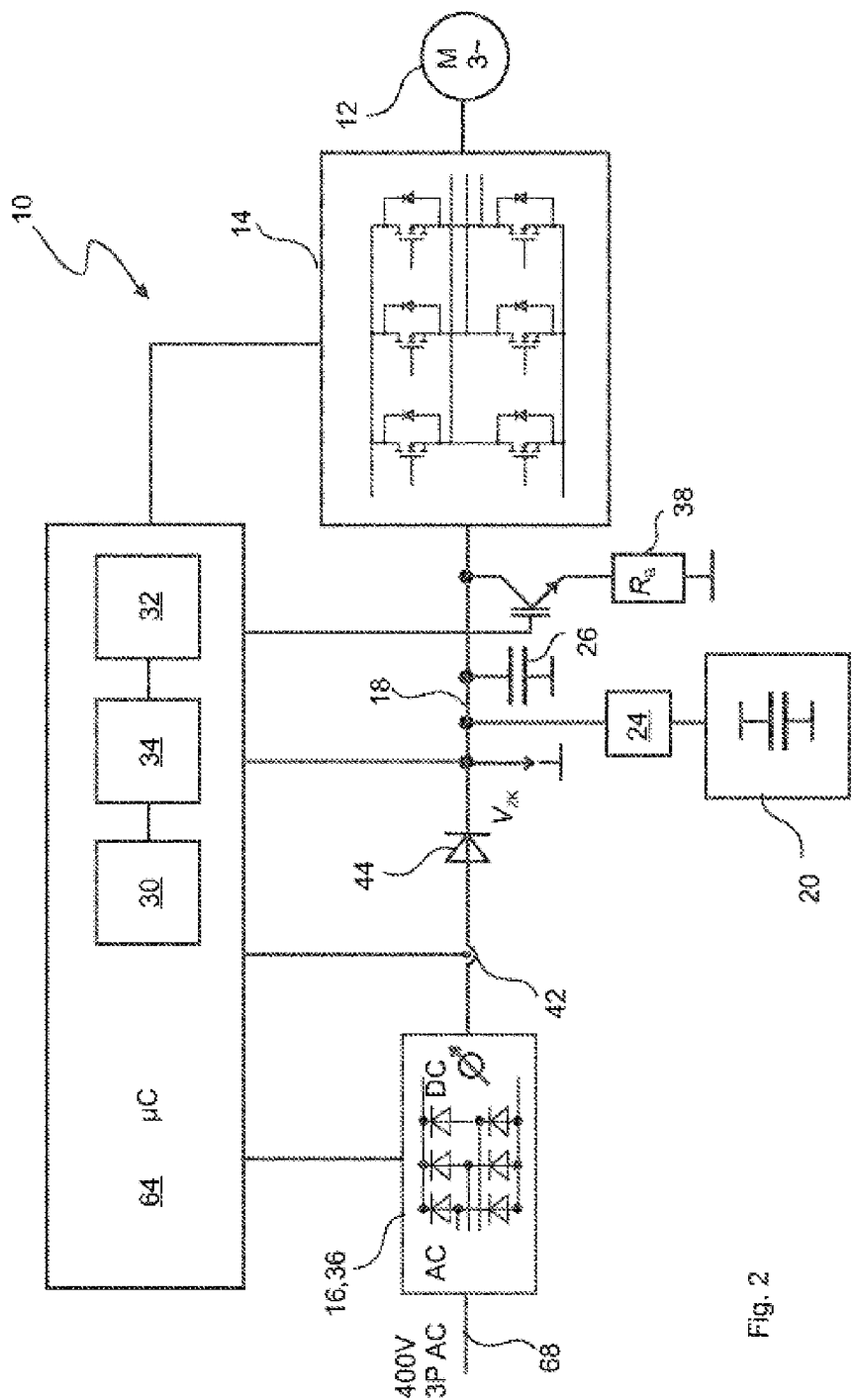
FIG. 2 shows a second embodiment of a pitch drive device according to the invention.

FIG. 2 shows a further exemplary embodiment of a pitch drive device 10 according to the invention. The pitch drive device 10 illustrated in FIG. 2 corresponds substantially to the embodiment illustrated in FIG. 1, and the description of the individual components is therefore largely dispensed with. The rectifier device 16 comprises a three-phase bridge rectifier in order to rectify the direct voltage intermediate circuit voltage $V_{ZK}$ of the intermediate circuit 18 from the three-phase power system voltage of the supply power system 68. In the intermediate circuit 18, one or more current-conducting diodes 44 are switched on in order to prevent a backflow of current from the inverter device to the rectifier device 16, with the result that voltage peaks which occur can be taken up by the intermediate circuit capacitor 26 alone. The inverter device 14 comprises a three-bridge inverter which contains six semiconductor switching elements, preferably IGBT switching elements, in order to convert the direct voltage $V_{ZK}$ of the intermediate circuit 18 into a PWM-modulated actuate position voltage for operating the synchronous motor 12 under rotational speed control. The semiconductor switching elements of the inverter device 14 are switched with the correct phases by the sensor control unit 32 in the normal operating mode and by the vector control unit 30 in the emergency operating mode, wherein the control switching unit 34 switches between these two control units 30, 32 at the transition from the normal operating mode to the emergency operating mode. However, it is also conceivable that the vector control unit 30 performs the rotational speed control both in the normal operating mode and in the emergency operating mode. The rectifier device 16 comprises a current control unit 36 which can control the level of the current flowing into the intermediate circuit 18 and can prevent an excessive current flow, in particular when the pitch drive device 10 starts, and can set the level of the intermediate circuit voltage $V_{ZK}$. In order to measure the current which is fed in by the rectifier device 16, a current measuring device 42, which signals the level of the current to the motor control device 64, is connected into the DC intermediate circuit 18, which motor control device 64 can in turn cause the current control unit 36 to control the level of the current.

An energy storage device 20 is connected directly to the intermediate circuit 18 via a coupling device 24, wherein the coupling device 24 does not permit energy to exchange between the intermediate circuit 18 and the energy storage device 20 until a predeterminable difference V, in potential is exceeded. In terms of design, a method of functioning and a sequence in an emergency operating mode, the exemplary embodiment in FIG. 2 corresponds to that in FIG. 1 to a large degree.

FIG. 3 is a schematic view of four exemplary embodiments of a passive coupling unit 24 which permits an energy storage device 20 to be coupled to the intermediate circuit 18 of a pitch drive device 10. In some cases, an intermediate circuit capacitor 26, which can compensate voltage fluctuations, smooth the intermediate circuit voltage $V_{ZK}$ and take up voltage peaks, is connected to the intermediate circuit 18. The energy storage device 20 comprises a capacitor arrangement 22 which permits high-capacitance energy storage of the backup energy store by means of capacitors which are connected in series and/or in parallel. The energy storage device 20 has the function of making energy available for a short-notice emergency operating movement of the pitch drive 12, to absorb the regenerative energy in the case of reversing processes and to make energy available for power peaks in the case of high torque requirements. The clutch unit 24 serves to prevent a flow of current in the case of small voltage differences between the intermediate circuit 18 and the internal capacitor voltage of the energy storage device 20, since the intermediate circuit capacitor 26 is to be used to compensate these voltage differences. A coupling unit 24 of the invention can contain individual elements or a combination of elements of the coupling units 24 presented below.

Figure 3A:
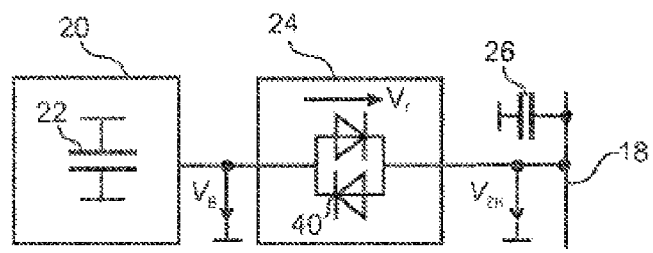
FIG. 3 shows a first to fourth coupling unit of an exemplary embodiment of a pitch drive device according to the invention.

FIG. 3a illustrates a first exemplary embodiment of a coupling unit 24 which comprises two interconnected semiconductor power diodes as coupling diodes 40 with a threshold value voltage $V_f$. A flow of current between the energy storage device 20 and the intermediate circuit 18 does not take place until the difference in potential exceeds the threshold value voltage $V_f$ of the coupling unit 24. This threshold value voltage $V_f$ can be increased as desired by connecting a plurality of diodes in series, with the result that, if appropriate, a "working division" is possible between the intermediate circuit capacitor 26 and the energy storage device 20.

Figure 3B:
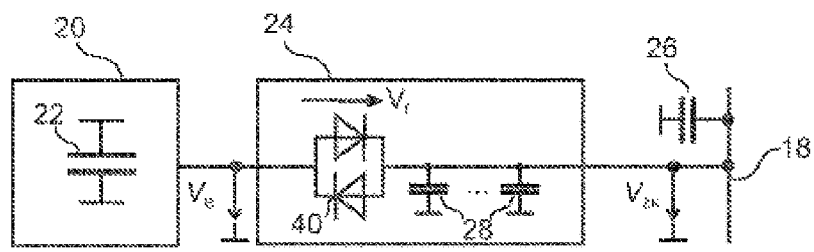

FIG. 3b illustrates a second exemplary embodiment of a coupling unit 24 which comprises one or more further intermediate circuit capacitors 28 which are connected in parallel upstream of the interconnected coupling diodes 40, between the potential rails of the intermediate circuit 30. The further intermediate circuit capacitors 28 increase the capacitance of the intermediate circuit capacitor 26 so that relatively high voltage peaks can be mitigated and improved ripple suppression and a more stable intermediate circuit 10 voltage $V_{ZK}$ are made possible.

Figure 3C:
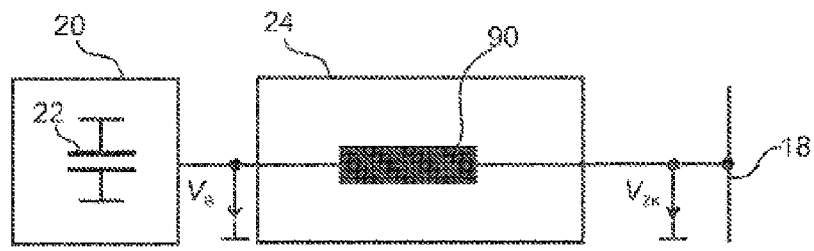

FIG. 3c illustrates a third exemplary embodiment of a coupling unit 24 which comprises an inductor circuit 90. The inductor circuit 90 can comprise one or more inductors through which currents can flow between the direct voltage energy storage device 20 and the direct voltage intermediate circuit 18. The inductor circuit 90 smooths power peaks and damps harmonics such as can occur in the case of rapid switching processes of the inverter device 14, failure of a network line, load change of the motor 12 or other faults. As a result, the energy storage device 20 is loaded constantly and protected against high-frequency current fluctuations, as a result of which the service life is increased.

Figure 3D:
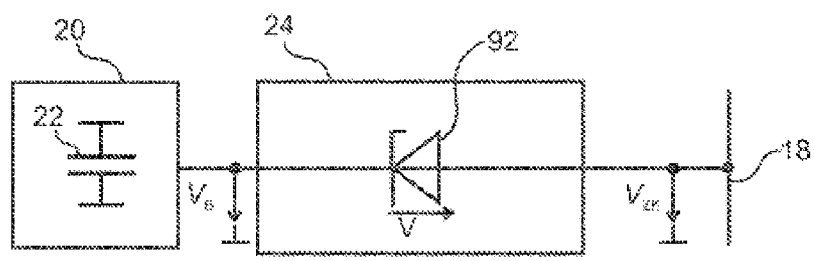

Furthermore, FIG. 3d shows a coupling unit 24 which comprises a zener diode switch 92. The zener diode switch 92 can comprise one or more zener diodes or comparable components which fulfill the purpose that a current flow from the energy storage device 20 in the direction of the intermediate circuit 18 does not come about until the intermediate circuit voltage $V_{ZK}$ is smaller than the voltage $V_B$ of the direct voltage energy storage device 20 by the absolute value of the zener voltage $V_Z$. Owing to the particular character of the zener diode, renewable energy of the intermediate circuit 18 is transferred into the energy storage device 20. As long as the voltage $V_B$ of the energy store 20 is $V_z$ higher than the intermediate circuit voltage $V_{ZK}$, the energy contained in the energy store 20 can be output to the intermediate circuit 18. During operation this means that the voltage $V_B$ of the energy store 20 can vary between $V_{ZK}+V_Z$ and $V_{Bmax}$ (maximum voltage of the energy store 20).

Figure 4:
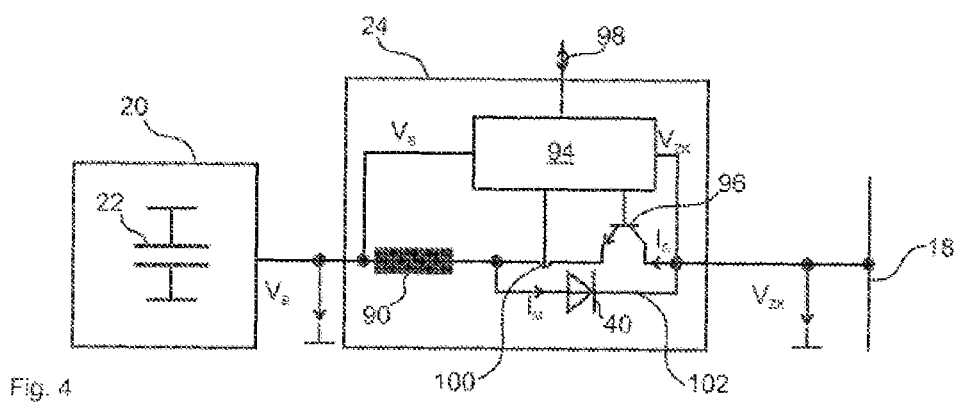
FIG. 4 shows an active coupling unit of an exemplary embodiment of a pitch drive device according to the invention.

FIG. 4 illustrates an active coupling unit 24 by which the energy storage device 20 of the intermediate circuit 18 can be switched on and off, with the result that the energy storage device 20 can be decoupled from the intermediate circuit 18. The coupling unit 24 comprises a control means 94 which is connected to a switching means 96, in this case a power transistor, for example IGBT. Furthermore, the control means 94 comprises a current sensor 100 for sensing a charge current IG which, in the switched-on state of the intermediate circuit 18, can flow to the energy storage device 24, as well as two voltage measuring sensors which can detect the voltage $V_B$ at the energy storage device 20 as well as $V_{ZK}$ at the intermediate circuit 18. Finally, the coupling unit 24 comprises an inductance circuit 90 and a bypass branch 102 which contains a coupling diode 40 and which bypasses the switching 25 means 96, with the result that provided that that $U_B>U_{ZK}$, current $I_M$ can flow from the energy storage device 20 to the intermediate circuit 18. As a result of the switching means 96 being switched on by the control means 94, regenerative current or charging current $I_G$ can flow from the intermediate circuit 18 into the energy storage device 20. If the intermediate circuit voltage $U_B$ drops below the level of the energy storage voltage $U_{ZK}$, the energy storage device supplies the intermediate circuit 18 with current via the diode 40. The switching means 94 can be connected, for example, to a motor control device (not illustrated) via a superordinate controller and can receive external commands relating to regular and/or controlled charging of the energy store 20, to activation during the powering up of the inverter 14 or to disconnection during a motor operating mode or in the case of specific operating ranges of the motor 12, for example during a high-load operating mode or a high-frequency operating mode. The control means 94 can activate the switching means 96 statically, for example when an external switch-on or switch-off signal is received, or, for example, perform controlled activation of the switching means 96 by means of a control method, for example by means of a closed control loop for controlling the charge current $I_G$.

Figure 5:
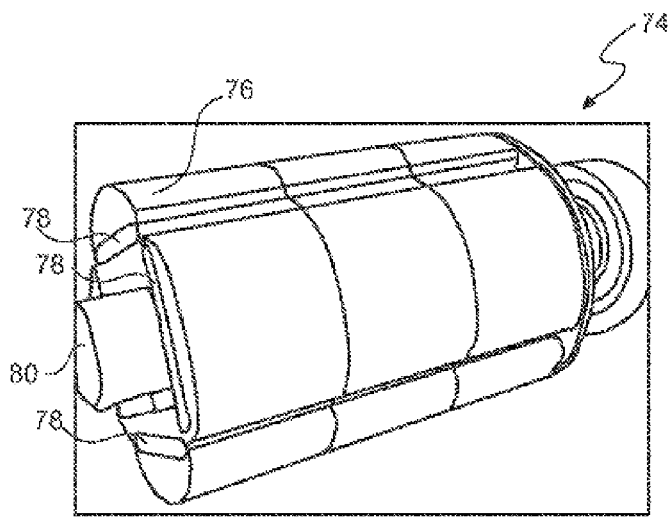
FIG. 5 shows a basic sketch of a rotor construction of an IPM synchronous motor for an exemplary embodiment of a pitch drive device according to the invention.

FIG. 5 is a schematic view of the basic design of a permanent magnet rotor 74 of an IPM synchronous machine. The rotor 74 has a rotor axis 80 and comprises a rotor laminated core 76, which has profiled pole bulgings corresponding to the number of concealed magnets. The rotor laminated core 76 is laminated in order to suppress eddy current losses. Four permanent magnets 78 which are offset by, in each case, 90° about the rotor axis 80 are buried in the interior of the rotor laminated core, i.e. are offset radially inward in contrast to SPM motors. Owing to this design, this type of motor has an excellent reluctance effect and is outstandingly suitable for sensorless control, particularly in the low rotational speed range and in the field-weakening operating mode in the case of a low intermediate circuit voltage which can be made available by the energy storage device 20.

Figure 6:
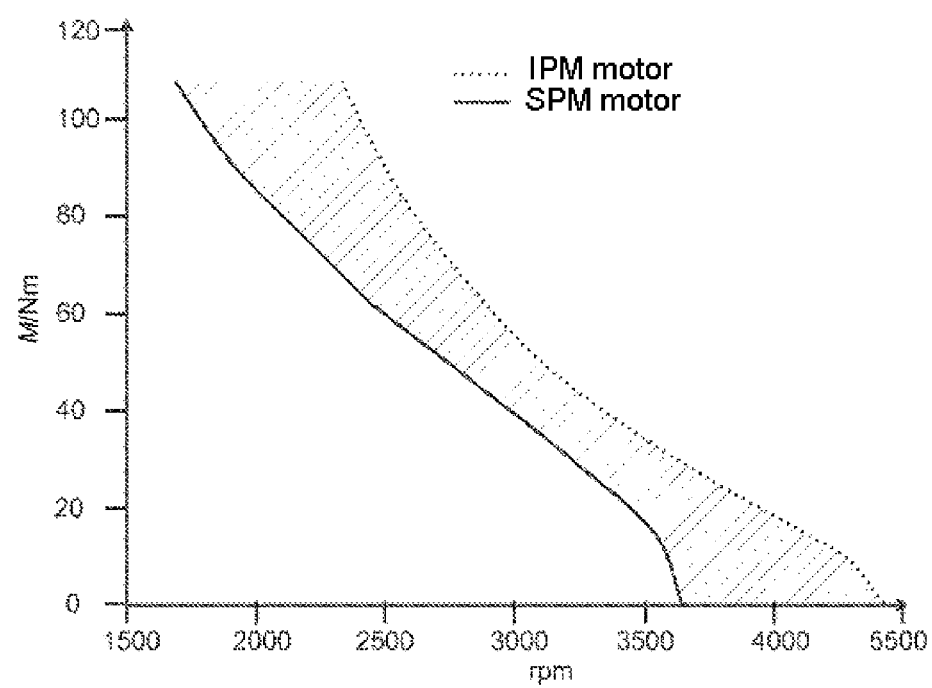
FIG. 6 shows a torque/rotational speed differentiation diagram between comparable IPM/SPM synchronous motors.

In FIG. 6, a torque/rotational speed M/rpm characteristic curve of a preferred IPM motor is contrasted with an SPM motor with the same power data. 35 The IPM motor has a higher rated rotational speed range for the same power drain and significantly higher torques M for the same rotational speeds rpm, and is therefore significantly superior to the SPM motor, particularly in the field-weakening operating mode. It is therefore possible, in particular in the emergency operating mode with a reduced intermediate circuit voltage $V_{ZK}$ which can be made available by an energy storage device 20, to make available a high torque M for an emergency movement at high rotational speeds rpm, wherein in the event of failure of rotational sensors, sensorless field-oriented vector control can be carried out even at low rotational speeds rpm by 10 virtue of the excellent reluctance effect.

The invention claimed is:

1. A pitch drive device comprising:
   an inverter device and a three-phase current drive motor configured to adjust the pitch of a rotor blade of a wind power plant or water power plant, wherein the drive motor is a three-phase current IPM (Interior Permanent Magnet) synchronous motor; and
   a direct voltage energy storage device connected in both a normal operating mode and in an emergency operating mode substantially directly to a direct voltage intermediate circuit between a rectifier device and the inverter device without isolating diodes, such that a level of an intermediate circuit voltage $V_{ZK}$ of the inverter device and of the energy storage device is nominally identical, in order to at least briefly supply energy to the IPM synchronous motor for driving said rotor blade in a safe vane position, with the result that the IPM synchronous motor can be operated at least briefly under rotational speed control in the safe vane position even when the intermediate circuit voltage $V_{ZK}$ is dropping, load peaks can be taken up by the stored energy in the energy storage device and reversing energy of the IPM synchronous motor can be stored in the energy storage device.

2. The device as claimed in claim 1, wherein the IPM synchronous motor is configured for a high rotational speed range of 300 to 3000 rpm, wherein an optimum efficiency level can be achieved in the lower rotational speed range, in particular in the range of a rated rotational speed of 500 rpm.

3. The device as claimed in claim 1, wherein the direct voltage energy storage device is a high-capacitance capacitor arrangement.

4. The device as claimed in claim 1, wherein the direct voltage energy storage device is configured for an intermediate circuit voltage $V_{ZK}$ of 100 V DC to 650 V DC.

5. The device as claimed in claim 1, wherein the direct voltage energy storage device is connected via a coupling unit, in particular a diode-based and/or inductor-based coupling unit, to the intermediate circuit in order to suppress interference voltage peaks, wherein the coupling unit preferably comprises at least one further intermediate circuit capacitor in order to increase the capacitance of an intermediate circuit capacitor.

6. The device as claimed in claim 5, wherein the coupling unit comprises a control means and a switching means, as a result of which at least a charge current $I_G$ can be switched from the direct voltage intermediate circuit to the direct voltage storage device.

7. The device as claimed in claim 6, wherein a bypass branch, which comprises a coupling diode for supplying the direct voltage intermediate circuit with a supply current $I_M$, is connected in parallel with the switching means, with the result that a supply current $I_M$ can flow independently of a switched state of the switching means.

8. The device as claimed in claim 6, wherein at least the switching means is a semiconductor switching means, and is preferably integrated in an IPM housing (Integrated Power Module) in a housing of a semiconductor power module together with semiconductor switching means of the inverter device and/or semiconductor bridge diodes of the rectifier device.

9. The device as claimed in claim 1, wherein the inverter device comprises a field-oriented vector control unit for controlling the rotational speed of the synchronous motor without a sensor, which vector control unit can perform rotational speed control at least in one operating mode and preferably in a low rotational speed range of the synchronous motor of 300 to 700 rpm, in particular in a rotational speed range of 500 rpm.

10. The device as claimed in claim 9, wherein the inverter device comprises a sensor control unit which is connected to one or more mechanical rotational speed/rotational angle/position sensors for controlling the rotational speed of the synchronous motor, and comprises a control switching unit which can switch between the sensor control unit for controlling the rotational speed in the normal operating mode and the vector control unit for controlling the rotational speed in the emergency operating mode.

11. The device as claimed in claim 1, wherein the rectifier device comprises a current control unit for limiting the picked-up power system current and/or for the current-regulated charging of the direct voltage energy storage device, of the intermediate circuit capacitor and of the inverter device, wherein in the normal operating mode the current control unit can adjust the intermediate circuit voltage $V_{ZK}$ to a presetable value.

12. The device as claimed in claim 1, wherein an emergency braking resistor unit is connected to the direct voltage intermediate circuit in such a way that it can be activated in order to divert electrical energy for rapid braking of the synchronous motor, wherein the braking resistor unit can be activated in particular in the case of an increased intermediate circuit voltage $V_{ZK}$.

13. A pitch drive device comprising:
an inverter device and a three-phase current drive motor configured to adjust the pitch of a rotor blade of a wind power plant or water power plant, wherein the drive motor is a three-phase current IPM (Interior Permanent Magnet) synchronous motor; and
a direct voltage energy storage device connected in both a normal operating mode and in an emergency operating mode via a coupling unit to a direct voltage intermediate circuit between a rectifier device and the inverter device in order to suppress interference voltage peaks and to at least briefly supply energy to the IPM synchronous motor for driving said rotor blade in a safe vane position, with the result that the IPM synchronous motor can be operated at least briefly under rotational speed control in the safe vane position even when an intermediate circuit voltage $V_{ZK}$ is dropping, whereby the coupling unit comprises a control means and a switching means, as a result of which at least a charge current $I_G$ can be switched from the direct voltage intermediate circuit to the direct voltage storage device.

14. A pitch drive device comprising:
an inverter device and a three-phase current drive motor configured to adjust the pitch of a rotor blade of a wind power plant or water power plant, wherein the drive motor is a three-phase current IPM (Interior Permanent Magnet) synchronous motor; and
a direct voltage energy storage device connected in both a normal operating mode and in an emergency operating mode substantially directly to a direct voltage intermediate circuit between a rectifier device and the inverter device in order to at least briefly supply energy to the IPM synchronous motor for driving said rotor blade in a safe vane position, with the result that the IPM synchronous motor can be operated at least briefly under rotational speed control in the safe vane position even when an intermediate circuit voltage $V_{ZK}$ is dropping, wherein the rectifier device comprises a current control unit for limiting the picked-up power system current and/or for the current-regulated charging of the direct voltage energy storage device, of an intermediate circuit capacitor and of the inverter device, wherein in the normal operating mode the current control unit can adjust the intermediate circuit voltage $V_{ZK}$ to a presetable value.

15. A pitch drive device comprising:
an inverter device and a three-phase current drive motor configured to adjust the pitch of a rotor blade of a wind power plant or water power plant, wherein the drive motor is a three-phase current IPM (Interior Permanent Magnet) synchronous motor; and
a direct voltage energy storage device connected in both a normal operating mode and in an emergency operating mode substantially directly to a direct voltage intermediate circuit between a rectifier device and the inverter device in order to at least briefly supply energy to the IPM synchronous motor for driving said rotor blade in a safe vane position, with the result that the IPM synchronous motor can be operated at least briefly under rotational speed control in the safe vane position even when an intermediate circuit voltage $V_{ZK}$ is dropping, wherein an emergency braking resistor unit is connected to the direct voltage intermediate circuit in such a way that it can be activated in order to divert electrical energy for rapid braking of the synchronous motor, wherein the braking resistor unit can be activated in particular in the case of an increased intermediate circuit voltage $V_{ZK}$.

* * * * *